US 6,641,766 B1

(12) United States Patent
Ishiwatari

(10) Patent No.: US 6,641,766 B1
(45) Date of Patent: Nov. 4, 2003

(54) POSITIVE DISPLACEMENT EXTRUSION OF VISCOUS MATERIAL

(75) Inventor: Takashi Ishiwatari, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 267 days.

(21) Appl. No.: 09/649,519

(22) Filed: Aug. 29, 2000

(30) Foreign Application Priority Data

Sep. 1, 1999 (JP) .............................. 11-247020

(51) Int. Cl.⁷ .............................. F04B 23/08; F04B 1/04
(52) U.S. Cl. .................. 264/211.23; 417/469; 425/461; 425/269
(58) Field of Search ................... 417/469, 201, 417/205, 462, 206, 202, 464, 273, 53; 264/211.21, 211.23, 349, 40.3; 425/461, 145, 149, 376.1, 382.3, 204

(56) References Cited

U.S. PATENT DOCUMENTS

| 1,641,509 A | | 9/1927 | Stewart | |
| 3,674,404 A | | 7/1972 | Burlis et al. | |
| 4,714,422 A | * | 12/1987 | Meeker et al. | ........... 264/210.1 |
| 5,132,549 A | | 7/1992 | Allan et al. | |
| 5,391,059 A | * | 2/1995 | Hallund | ................. 417/273 |
| 5,466,132 A | | 11/1995 | Deal | |
| 5,655,891 A | | 8/1997 | Deal et al. | |
| 5,698,235 A | * | 12/1997 | Satoh et al. | ........... 264/211.21 |

FOREIGN PATENT DOCUMENTS

| DE | 138 523 | | 11/1979 | |
| EP | 0 334 276 A2 | | 9/1989 | |
| JP | 58175641 A | * | 10/1983 | ............. B29F/1/00 |
| JP | 63031730 A | * | 2/1988 | ........... B29C/47/92 |

* cited by examiner

Primary Examiner—Michael Colaianni
Assistant Examiner—Geoffrey Shipsides
(74) Attorney, Agent, or Firm—Oliff & Berridge, PLC

(57) ABSTRACT

A positive displacement extruder for a viscous material, such as unvulcanized rubber, includes a feed member arranged in a chamber of a main body and driven for rotation so that the viscous material charged into the chamber is extruded from its outlet. A mouthpiece has an inlet that is spaced in a circumferential direction from the outlet of the main body and, in communication therewith, an extrusion nozzle. At least one cylinder device is rotatable about a center axis of the extruder so that the cylinder is alternately bought into communication with the outlet of the main body and the inlet of the mouthpiece. The viscous material is charged from the chamber of the main body into the cylinder device and discharged from the cylinder device into the mouthpiece, as the cylinder device is rotated about the center axis of the extruder and the piston of the cylinder device is driven by a cam device to reciprocate in the cylinder.

7 Claims, 2 Drawing Sheets

POSITIVE DISPLACEMENT EXTRUSION OF VISCOUS MATERIAL

BACKGROUND OF THE INVENTION

1. Field of the Invention

The present invention relates a method of, and an apparatus for highly precisely performing a positive displacement extrusion of a viscous material, such as unvulcanized rubber.

2. Description of Related Art

A positive displacement pump is widely used for discharging a constant volume of various kinds of fluid. Typically, a positive displacement pump includes a cylinder device comprised of a piston and a cylinder, a shoe plate for causing a reciprocating movement of the piston in the cylinder, and a valve mechanism driven synchronously with the shoe plate such that a constant volume of fluid is introduced into, and discharged from the cylinder during a stroke motion of the piston. This type of positive displacement pump is known to be an effective means for discharging a constant volume of fluids. With such a pump, it is readily possible to adjust the discharge volume of the fluid by changing the stoke of the piston, and also to eliminate fluctuation or pulsation in the discharge volume by increasing the number of the cylinder device.

However, particularly when used to extrude a highly viscous material, such as unvulcanized rubber, the above-mentioned positive displacement pump often suffers from clogging of the viscous material between the opposite surfaces of the piston and the cylinder. In this instance, the viscous material tends to be forced by the shoe plate to cause damages of the cylinder device. Moreover, the inlet and the outlet of the cylinder are of a round shape, and such a shape is considered to be a major cause of unsatisfactory positive displacement performance of the pump.

SUMMARY OF THE INVENTION

It is therefore a primary object of the present invention to realize an improved positive displacement extruder for a viscous material, which is substantially free from the problem of clogging of the viscous material and which provides a satisfactory positive displacement performance.

According to a first aspect of the present invention, there is provided a positive displacement extruder for a viscous material, comprising: a main body having a chamber therein and an inlet and an outlet for the viscous material, said inlet and outlet being in communication with the chamber; a feed member rotatably arranged in the chamber of the main body and adapted to be driven for rotation so that the viscous material charged into the chamber through the inlet is extruded from the outlet; a mouthpiece having an inlet that is spaced in a circumferential direction from the outlet of the main body, and an extrusion nozzle in communication with the inlet of the mouthpiece; at least one cylinder device comprising a cylinder and a piston that can be reciprocated in the cylinder, said cylinder device being rotatable about a center axis of the extruder so that the cylinder is alternately bought into communication with the outlet of the main body and the inlet of the mouthpiece; and a cam device for causing a reciprocating movement of the piston in the cylinder.

With the extruder according to the present invention, the viscous material introduced into the chamber of the main body is moved toward the outlet under the rotation of the feed member, and then fully charged into the cylinder of the cylinder device as it is brought into communication with the chamber of the main body. When the cylinder device charged with the viscous material is further rotated so that the cylinder reaches a position where it establishes a communication with the mouthpiece, the advancing stroke movement of the piston induced by the cam device forces the viscous material into the mouthpiece so as to be extruded from the extrusion nozzle, until the cylinder device is moved past the inlet of the mouthpiece.

It is assumed that after the cylinder device has moved past the outlet of the main body, the outlet is tightly sealed by an appropriate seal device that is rotatable with the cylinder device, until the cylinder device reestablishes the communication with the chamber in the main body. Similarly, after the cylinder device has moved past the inlet of the mouthpiece, the inlet is tightly sealed by the seal device until the cylinder device reestablishes the communication with the mouthpiece.

The transfer of the viscous material from the cylinder device to the mouthpiece is steadily carried out during the period in which the cylinder device is in communication with the mouthpiece. When the cylinder device moves past the inlet of the mouthpiece, all the volume of the viscous material in the cylinder has been simultaneously transferred into the mouthpiece without any remainder in the cylinder. As a result, a precisely predetermined volume of the viscous material can be steadily extruded from the nozzle of the mouthpiece, without causing clogging in the interior of the extruder. The extruder according to the present invention can be readily realized to have a compact structure, and is substantially free from noticeable fluctuation or pulsation in the discharge volume of the viscous material.

In a preferred embodiment of the present invention, the extruder comprises a plurality of the cylinder devices that are arranged around the center axis of the extruder as being circumferentially spaced from each other. In this instance, during the period in which the viscous material from the outlet of the main body is charged into the cylinder of one cylinder device, the viscous material contained in the cylinder of another cylinder device can be synchronously discharged into the mouthpiece though the inlet thereof. Thus, while preserving the functional advantage that a highly precise volume of the viscous material can be steadily discharged, it is possible to provide a further improved extrusion efficiency of the extruder.

In another preferred embodiment of the present invention, the extruder further comprises a common drive for the feed member and the cylinder device. In this instance, it is possible to reduce the equipment cost and the running cost of the extruder, and also to realize a compact structure as a whole.

According to a second aspect of the present invention, there is provided a method for extruding a viscous material with the positive displacement extruder explained above, wherein the method comprises the steps of: causing said at least one cylinder device to rotate about the center axis of the extruder; and charging the viscous material from the outlet of the main body into the cylinder, and subsequently discharging the viscous material from the cylinder into the inlet of the mouthpiece, during one turn of rotation of the cylinder device about the center axis of the extruder. In this way, since the cylinder device has a constant volume of the cylinder, a constant volume of the viscous material from the chamber of the main body can be charged into the cylinder of the cylinder device, and also the same constant volume of the viscous material from the cylinder can be charged into the mouthpiece, thereby allowing a positive displacement of the viscous material to be performed highly accurately.

Advantageously, the above-mentioned method according to the present invention is carried out by using an extruder comprised of a plurality of cylinder devices that are arranged about the center axis of the extruder and circumferentially spaced from each other. It is then preferred that the viscous material is charged into the cylinder of one cylinder device and, synchronously therewith, the viscous material is discharged from the cylinder of another cylinder device.

The discharge of the viscous material from the cylinder of one cylinder device is preferably started immediately before completion of the discharge of the viscous material from the cylinder of another cylinder device. In this instance, for example, during a progressive decrease in the opening degree of the cylinder of a first cylinder device with respect to the inlet of the mouthpiece and, hence, in the discharge rate of the viscous material from the first cylinder device, the opening degree of the cylinder of the second cylinder device with respect to the inlet of the mouthpiece is progressively increased to gradually decrease the discharge rate of the viscous material. Thus, fluctuation or pulsation in the discharge rate of the viscous material from the nozzle of the mouthpiece is minimized and the overall discharge rate of the viscous martial is maintained substantially constant.

BRIEF DESCRIPTION OF THE DRAWINGS

The present invention will be explained below in further detail, with reference to the preferred embodiments shown in the drawings, in which.

DETAILED DESCRIPTION OF THE PREFERRED EMBODIMENTS

Figure 1:
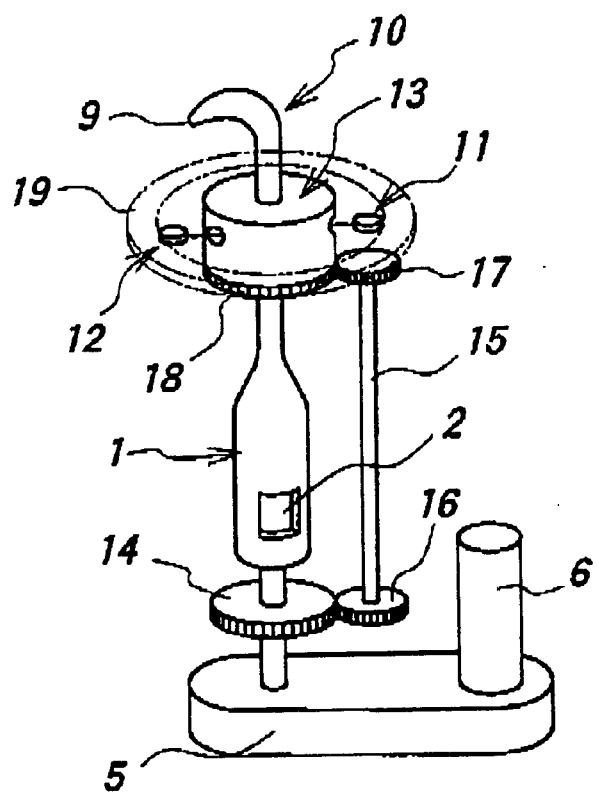
FIG. 1 is a schematic perspective view showing the extruder according to one embodiment of the present invention.
Figure 2:
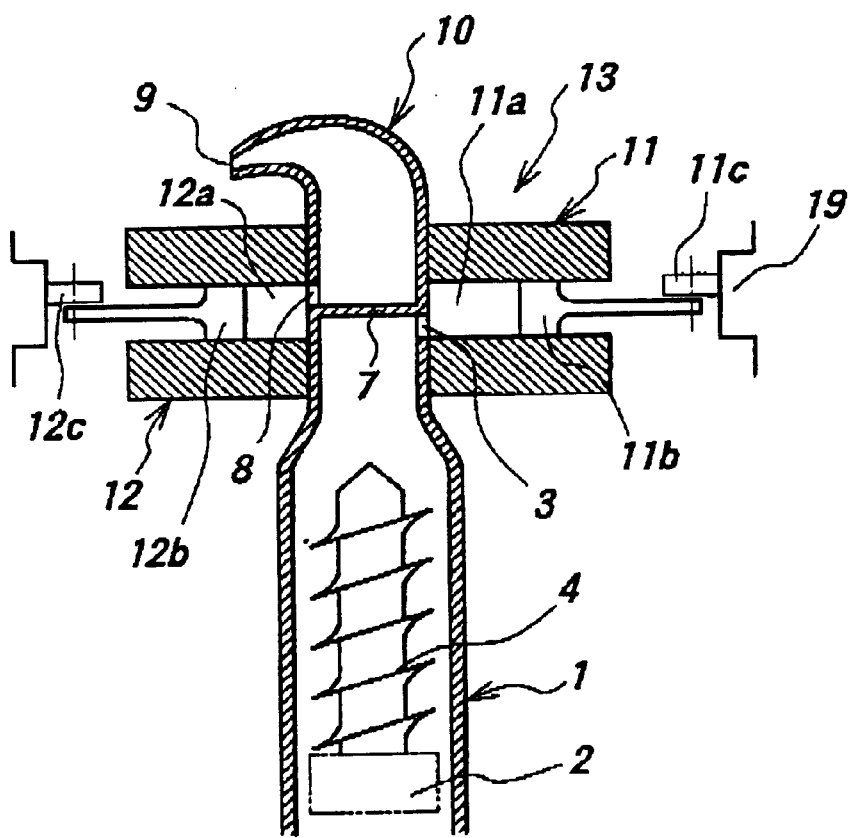
FIG. 2 is a schematic sectional view showing the major elements of the extruder of FIG. 1.
Figure 3:
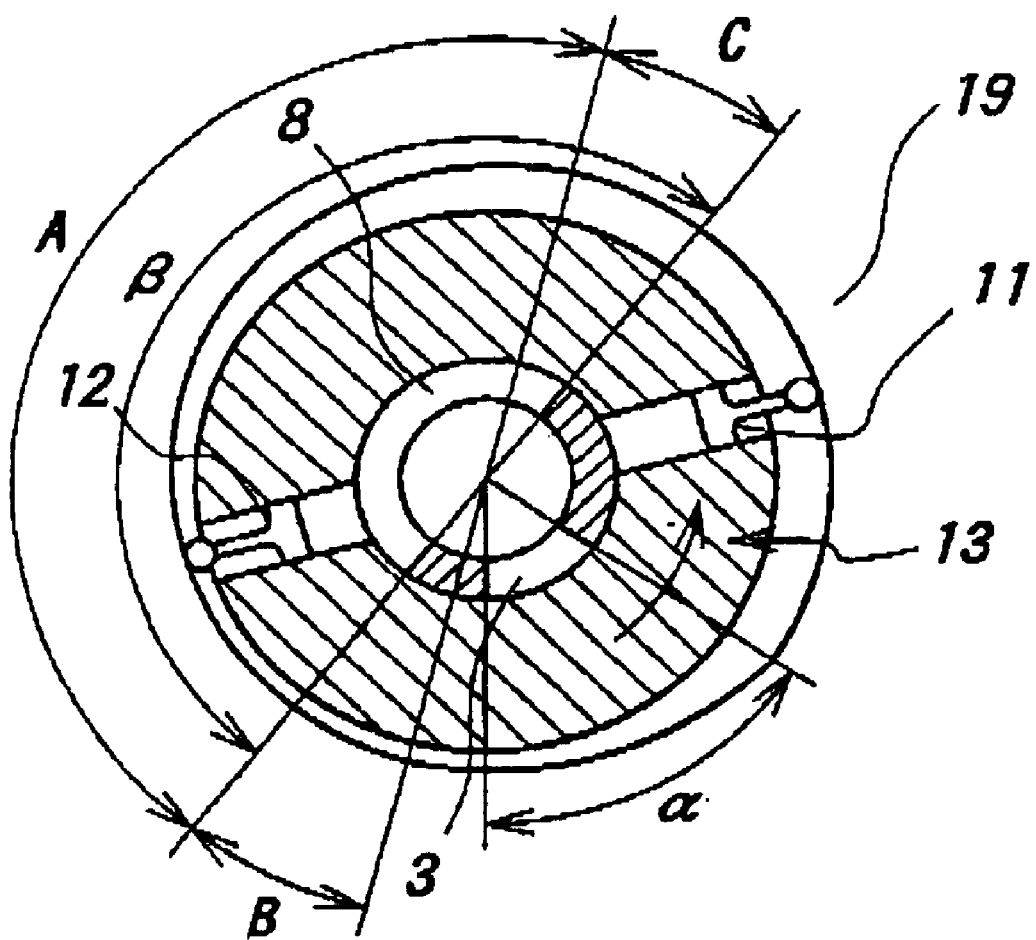
FIG. 3 is a schematic view showing the arrangement of the cylinder devices in relation to the inlet and outlet, in the extruder of FIG. 1.

Referring now to FIGS. 1 to 3, there is shown an extruder according to a preferred embodiment of the present invention, which includes a stationary, generally cylindrical main body 1 having a vertical center axis. The main body 1 has a chamber therein, which is in communication with an inlet 2 and an outlet 3. The inlet 2 is formed in the lower part of the main body 1, while the outlet 3 is formed on the sidewall of the main body 1 adjacent to its closed top wall 7. A feed screw 4 is rotatably arranged in the chamber of the main body 1 so as to feed a highly viscous material, e.g., an unvulcanized rubber, from the inlet 2 to the outlet 3. To this end, the feed screw 4 has a lower end that is connected to an electric motor 6 through an appropriate speed reduction mechanism 5.

A mouthpiece 10 is coaxially arranged on the upper side of the main body 1, as an integral structure therewith. The mouthpiece 10 has an inlet 8 on its sidewall adjacent to the top end wall 7 of the main body 1, and an extrusion nozzle 9 in communication with the inlet 8. The inlet 8 of the mouthpiece 10 is arranged at a location that is circumferentially spaced from the outlet 3 of the main body 1.

A pair of cylinder devices 11, 12 carried by a cylindrical holder 13 are arranged on the outer peripheral surface of the main body 1 and the mouthpiece 10 at diametrically opposite positions relative to each other and at an axial location corresponding to the outlet 3 of the main body 1 and the inlet 8 of the mouthpiece 10. The cylinder devices 11, 12 are rotatable about the center axis of the extruder and alternately brought into communication with the outlet 3 of the main body 1 and the inlet 8 of the mouthpiece 10. The holder 13 has an inner peripheral surface that serves as a seal element for the outlet 3 of the main body 1 and the inlet 8 of the mouthpiece 10, by maintaining a liquid-tight sliding contact with the outer peripheral surface of the main body 1 and the mouthpiece 10 during rotation of the cylinder devices 11, 12.

In order to rotate the cylinder devices 11, 12 about the center axis of the extruder, the feed screw 4 is provided with a gear 14 on its drive shaft, and a shaft 15 is arranged in parallel with the drive shaft and provided with gears 16, 17 on its lower and upper ends, respectively. The gear 16 at the lower end of the shaft 15 is meshed with the gear 14 of the feed screw 4, and the gear 17 at the upper end of the shaft 15 is meshed with a gear 18 that is provided for the holder 13 of the cylinder devices 11, 12. With such an arrangement of the reduction gear train, when the electric motor 6 for the feed screw 4 is actuated, it is possible to rotate the cylinder devices 11, 12 about the center axis of the extruder, under a reduction speed ratio that is declined by the number of teeth of the gears 14, 16, 17, 18.

The cylinder device 11 is comprised of a cylinder 11a having an opening which is alternately brought into communication with the outlet 3 of the main body 1 and the inlet 8 of the mouthpiece10, a piston 11b that can be reciprocated in the cylinder 11a toward and away from the opening, and a cam follower in the form of a roller 11c at the rod end of the piston 11b. Similarly, the cylinder device 12 is cold of a cylinder 12a having an opening which is alternately brought into communication with the outlet 3 of the main body 1 and the inlet 8 of the mouthpiece10, a piston 12b that can be reciprocated in the cylinder 12a toward and away from the opening, and a cam follower in the form of a roller 12c at the rod end of the piston 12b.

A stationary cam ring 19 is arranged on the outer side of the cylinder devices 11, 12 and has an inner peripheral cam surface that is engaged by the rollers 11c,12c of the cylinder devices 11, 12. Thus, as the cylinder devices 11, 12 are rotated about the center axis of the extruder, the rollers 11c, 12c of the cylinder devices 11, 12 are caused to slide along the cam surface of the cam ring 19 so that the pistons 11b, 12b are reciprocated in the cylinders 11a, 12a toward and away from the respective openings. It may be assumed that the volume of the viscous material to be charged into, and discharged from the cylinders 11a, 12a of the cylinder devices 11, 12 can be changed by a suitable adjusting mechanism, known per se.

With the extruder of the illustrated embodiment having a structure explained above, a positive displacement extrusion of the viscous material is carried out in the following manner:

A viscous material, such as unvulcanized rubber, is gradually in reduced into the chamber of the main body 1 from the inlet 2 and moved toward the outlet 3 under the rotation of the feed screw 4. The cylinder devices 11, 12 are rotated about the center axis of the extruder, synchronously with the feed screw 4. Thus, the viscous material discharged from the outlet 3 of the main body 1 is gradually charged into the cylinder of one of the cylinder devices 11, 12. At the same time, the viscous material filling the cylinder of the other one of the cylinder devices 11, 12 is gradually charged into the mouthpiece 10 and steadily extruded from the nozzle 9 of the mouthpiece 10 with a substantially constant extrusion rate.

More particularly, in the operative position shown in FIG. 2, the viscous material from the outlet 3 of the main body 1 is gradually charged into the cylinder 11a which is currently in communication with the outlet 3 of the main body 1, until the cylinder device 11 has been rotated to a position past the outlet 3 and the piston 11b moved to the retracted position in the cylinder 11a. On this occasion, the cylinder 12a of the other cylinder device 12 is in communication with the inlet 8 of the mouthpiece 10, with the piston 12b being moved to its advanced position as a result of rotation of the cylinder device 12 about the center axis of the extruder and relative to the cam ring 19. Thus, the viscous material in the cylinder 12a of the cylinder device 12 is gradually discharged into the mouthpiece 10 and thereby steadily extruded from the nozzle 9 with a substantially constant extrusion rate.

Subsequently, as a result of further rotation of the cylinder devices 11, 12 about the center axis of the extruder, the cylinder device 11 moving away from the outlet 3 of the main body 1 gradually approaches the inlet 8 of the mouthpiece 10. As soon as the cylinder device 11 is brought into communication with the inlet 8 of the mouthpiece 10, the piston 11b is caused by the cam ring 19 to move to its advanced position so that the viscous material in the cylinder 11a begins to be discharged into the mouthpiece 10. The gradual discharge of the viscous material from the cylinder device 11 is maintained until the cylinder device 11 has been rotated to a position past the inlet 8 of the mouthpiece 10 and the piston 11b moved to the advanced position in the cylinder 11a. Thus, the viscous material in the mouthpiece 10 gradually discharged from the cylinder device 11 is steadily extruded from the nozzle 9 with a substantially constant extrusion rate. On this occasion, the viscous material in the chamber of the main body 1 is discharged from the outlet 3 and charged into the cylinder of the cylinder device 12, in the manner described above with reference to the cylinder device 11.

In this way, with the extruder according to the illustrated embodiment of the present invention, a predetermined volume of the viscous material is charged into, and discharged from the cylinders 11a, 12a of the cylinder devices 11, 12 highly accurately and with a predetermined timing under the rotation of the cylinder devices 11, 12 about the center axis of the extruder and with reference to the stationary cam ring 19. It is therefore possible to prevent clogging of the viscous material in the cylinder devices 11, 12 and assure a highly accurate positive displacement extrusion of the viscous material from the nozzle 9 of the mouthpiece 10 at any time during the operation of the extruder. Also, the simultaneous operation of a plurality of cylinder devices 11, 12 serves to significantly improve the operating efficiency of the extruder as a whole.

In the extruder according to the present invention, the outlet 3 of the main body 1, the inlet 8 of the mouthpiece 10 and the cylinder devices 11, 12 may have a geometrical relationship as schematically shown in FIG. 3, wherein the outlet 3 of the main body 1 extends over a relatively small angle α and the inlet 8 of the mouthpiece 10 extends over an angle β which is substantially 180 degrees, with the cylinder devices 11, 12 arranged at diametrically opposite positions relative to each other, as explained above. In this instance, assuming that one cylinder device 11 has completed charging of the viscous material from the chamber of the main body and the other cylinder device 12 is in the course of discharging the viscous material into the mouthpiece 10, when the cylinder device 12 is in a region A in which the opening of the cylinder 12a is fully in communication with the inlet 8 of the mouthpiece 10, the viscous material in the cylinder 12a can be steadily discharged into the mouthpiece 10 with a substantially constant discharge rate, whereas when the cylinder device 12 reaches another region B in which the area of the opening of the cylinder 12a in communication with the inlet 8 of the mouthpiece 10 is gradually decreased, thereby causing a gradual decrease of the discharge rate of the viscous material and making it difficult to achieve a steady discharge rate.

Therefore, it is highly preferred that as soon as the cylinder device 12 reaches the region B, the cylinder device 11 which has completed charging of the viscous material is caused to reach another region C in which the cylinder 11a is gradually brought into communication with the inlet of the mouthpiece 10 and the piston 11b is gradually moved to its advanced position. With such an arrangement, the above-mentioned gradual decrease in the discharge rate of the viscous material from the cylinder device 12 is compensated for by the gradual increase in the dirge rate of the viscous material from the cylinder device 11, thereby maintaining the total discharge rate of the viscous material into the mouthpiece 10 substantially the same as the discharge rate in the steady state. As a result, it is possible to achieve a substantially constant extrusion rate of the viscous material from the extrusion orifice 9 of the mouthpiece 10.

In the illustrated embodiment, as soon as the cylinder devices 11, 12 have been moved past the regions C and B, respectively, the discharge of the viscous material from the cylinder device 12 into the mouthpiece 10 is completely stopped and the opening of the cylinder 11a of the cylinder device 11 is completely communicated with the inlet 8 of the mouthpiece 10 to begin a steady discharge of the viscous material from the cylinder device 11 to the mouthpiece 10.

In this way, in order to maintain a substantially constant elusion rate of the viscous material from the extrusion orifice 9 of the mouthpiece 10, it is highly preferred that the viscous material is charged into the cylinder 12a of the cylinder device 12 while the cylinder device 11 is in the region A, and the cylinder device 12 is caused to reach the region C simultaneously when the cylinder device 11 reaches the region B.

It will be appreciated that the present invention provides an improved positive displacement extruder for a viscous material, which is substantially free from the problem of clogging of the viscous material and which provides a satisfactory positive displacement performance.

While the present invention has been described above with reference to specific embodiments, it is needless to say that various changes and/or modifications are possible without departing from the scope of the invention. Thus, for example, the number of the cylinder devices may be changed in view of the required performance of the extruder, and/or the cylinder devices may be arranged on the upper or lower side of the extruder or may be arranged with a predetermined inclination angle relative to the center axis of the extruder.

What is claimed is:

1. A positive displacement extruder for a viscous material, comprising:
   a main body having a chamber therein and an inlet and an outlet for the viscous material, said inlet and outlet being in communication with the chamber;
   a feed member rotatably arranged in the chamber of the main body and adapted to be driven for rotation so that the viscous material charged into the chamber through the inlet is extruded from the outlet;

a mouthpiece having an inlet that is spaced in a circumferential direction from the outlet of the main body, and an extrusion nozzle in communication with the inlet of the mouthpiece;

at least one cylinder device comprising a cylinder having an opening and a piston that can be reciprocated in the cylinder, said cylinder device rotatable about a center axis of the extruder so that the cylinder opening is alternately brought into communication with the outlet of the main body and the inlet of the mouthpiece;

a cylinder device holder carrying the at least one cylinder device;

a drive mechanism connecting the feed member to the cylinder device holder, wherein said drive mechanism provides a common drive for the feed member and the cylinder device holder; and a stationary cam device for causing a reciprocating movement of the piston in the cylinder.

2. The extruder according to claim 1, comprising a plurality of said cylinder devices, wherein said cylinder devices are arranged about the center axis of the extruder and circumferentially spaced from each other.

3. The extruder according to claim 1, wherein the drive mechanism comprises a shaft with a gear on its upper and lower ends and connects to the feed member and to the cylinder holder by meshing the gears on its upper and lower ends with a gear on the feed member and a gear on the cylinder holder.

4. A method for extruding a viscous material with a positive displacement extruder which comprises (i) a main body having a chamber therein and an inlet and an outlet for the viscous material, said inlet and outlet being in communication with the chamber, (ii) a feed member rotatably arranged in the chamber of the main body and adapted to be driven for rotation so that the viscous material charged into the chamber through the inlet is extruded from the outlet, (iii) a mouthpiece having an inlet that is spaced in a circumferential direction from the outlet of the main body, and an extrusion nozzle in communication with the inlet of the mouthpiece, (iv) at least one cylinder device comprising a cylinder having an opening and a piston that can be reciprocated in the cylinder, said cylinder device being rotatable about a center axis of the extruder so that the cylinder opening is alternately brought into communication with the outlet of the main body and the inlet of the mouthpiece, (v) a cylinder device holder carrying the at least one cylinder, (vi) a drive mechanism connecting the feed member to the cylinder device holder, wherein said drive mechanism provides a common drive for the feed member and the cylinder device holder, and (vii) a stationary cam device for causing a reciprocating movement of the piston in the cylinder, wherein the method comprises the steps of:

causing said at least one cylinder device to rotate about the center axis of the extruder; and charging the viscous material from the outlet of the main body into the cylinder, and subsequently discharging the viscous material from the cylinder into the inlet of the mouthpiece, during one turn of rotation of the cylinder device about the center axis of the extruder.

5. The method according to claim 4, wherein the extruder comprises a plurality of said cylinder devices arranged about the center axis of the extruder and circumferentially spaced from each other, said method further comprising the steps of:

charging the viscous material into the cylinder of one of said cylinder devices; and, synchronously therewith, discharging the viscous material from the cylinder of another one of said cylinder devices.

6. The method according to claim 5, comprising the step of starting the discharge of the viscous material from the cylinder of one of said cylinder devices, immediately before completion of the discharge of the viscous material from the cylinder of another one of said cylinder devices.

7. The method according to claim 4, wherein the drive mechanism comprises a shaft with a gear on its upper and lower ends and connects to the feed member and to the cylinder holder by meshing the gears on its upper and lower ends with a gear on the feed member and a gear on the cylinder holder.

* * * * *